United States Patent [19]

Justice

[11] 3,825,674

[45] July 23, 1974

[54] EDUCATIONAL TV BRANCHING SYSTEM

[75] Inventor: James W. H. Justice, Murrysville, Pa.

[73] Assignee: Westinghouse Electric Corporation, Pittsburgh, Pa.

[22] Filed: May 25, 1973

[21] Appl. No.: 364,164

[52] U.S. Cl......... 178/5.6, 178/DIG. 23, 179/15 BM

[51] Int. Cl. ............................................. H04n 7/08

[58] Field of Search........... 178/5.6, DIG. 23, 5.4 R, 178/5.2 R, 5.8 A, 5.8 R, 6.8, 7.7, DIG. 6; 179/15 BM

[56] References Cited

UNITED STATES PATENTS

| | | | |
|---|---|---|---|
| 2,875,271 | 2/1959 | Moore et al. | 178/5.2 |
| 2,912,492 | 11/1959 | Haantjes et al. | 178/5.2 |
| 3,180,931 | 4/1965 | Morchand | 178/DIG. 23 |
| 3,256,386 | 6/1966 | Morchand | 178/DIG. 23 |

FOREIGN PATENTS OR APPLICATIONS

| | | | |
|---|---|---|---|
| 755,824 | 8/1956 | Great Britain | 178/DIG. 23 |

*Primary Examiner*—Richard Murray
*Assistant Examiner*—R. John Godfrey
*Attorney, Agent, or Firm*—M. P. Lynch

[57] ABSTRACT

A closed circuit or conventional TV broadcast system features the transmitting and receiving of 12 separate pictures and including 12 audio channels on a single television carrier signal such that one of three different pictures appear in each quadrant of the television receiving tube, and including in the receiver, two detectors each preceded by band-pass filters for preventing cross-modulation of the video signals. The system further includes means for blanking out all but one quadrant and for centering and expanding that quadrant to occupy a full television raster.

Twelve TV cameras have their video output signals arranged in four groups of three signals. A blanker for each group blanks out all but one quadrant so that three video signals are provided for this quadrant. Blankers for the other groups of video signals operate in a similar manner with respect to the remaining three quadrants. By adding together one video signal from each group there results three composite signals. Each composite signal represents an assembly of four pictures each occupying one quadrant of the TV raster. The composite signals are connected to the Y, I and Q inputs of a modified encoder for transmission on a single TV carrier signal.

Twelve audio channels are arranged in two groups of six signal inputs. One group of six signals is inserted in a video signal line during a guard-band blank period as three bursts of amplitude and phase modulated subcarriers. A guard-band blank period is provided in the next video line for transmission of the other set of six audio signals in a similar manner.

19 Claims, 8 Drawing Figures

EDUCATIONAL TV BRANCHING SYSTEM

BACKGROUND OF THE INVENTION

Systems, such as those shown in Morchand U.S. Pat. Nos. 3,180,931 and 3,256,386, have been provided for simultaneously transmitting over a single television channel carrier frequency, a plurality of pictures which are normally displayed in four quadrants of a television receiving tube. In these systems, one or more of the quadrants can be blanked out by switches at the receiver so that the viewer sees only a selected one or more of the quadrants. An arrangement of this sort is particularly adaptable for use in educational television systems. Thus, the instructor at the transmitting station may cause different scenes or written material to appear at the four quadrants of a remote receiving tube as viewed by the student. He could then propose a problem via the audio channel of the television system and ask which one of the four quadrants contains the correct answer, for example, in a multiple choice answer to the question. By depressing one of the four switches at the receiver, the student would then blank out all but the one of the four quadrants which he feels contains the correct answer. The instructor would then advise the students viewing individual receiving tubes of the correct answer.

Let it be assumed, for example, that the correct answer is in the first quadrant of the picture tube. If the student picked the wrong answer, he would be instructed to depress the switch for the correct quadrant whereupon the subject matter shown in the correct quadrant would be discussed by the instructor.

In systems of this type, while usable, they are not altogether satisfactory for the reason that the information ultimately studied by the student is limited to that which is displayed in the four quadrants of the picture tube along with the audio channel. This is seen to provide a severe handicap to the capabilities of such systems. Moreover, the student may experience severe difficulty in reading the written material or even viewing the scene which is displayed in only one quadrant of the picture tube which is, of course, one-quarter the size of the picture tube.

To some extent, these shortcomings of the prior art have been overcome in the field of educational television by the systems disclosed in copending application Ser. No. 364,165, filed May 25, 1973; Ser. No. 364,163 and Ser. No. 364,161, filed concurrently herewith and assigned to the Assignee of the present application. In application Ser. No. 364,165, there is disclosed an educational television system wherein video signals for one color program could be transmitted in a conventional manner or the system could transmit and receive concurrently three independent monochrome pictures. Three monochrome camera output signals were connected separately to the Y, I and Q inputs of a modified encoder which produced a modulated radio-frequency signal having the characteristics of a standard color TV signal. A modified decoder at the receiver was used to obtain the original independent video signals. Coding and switching logic circuitry in the receiver were used to selectively allow one of the independent video signals to produce a picture utilizing a full television raster. This system had the distinct advantage of overcoming the objectionable practice of occupying a number of different radio-frequency channels wherein one channel was required for each program source. The system also eliminated the endless switching from channel to channel to avoid excessive wear and premature failure of conventional tuner assemblies.

In application Ser. No. 364,161, there is provided an education television system for transmitting and receiving on a single television carrier signal four different pictures which are displayed one in each quadrant of a television receiving tube. This system included blanking circuitry operative to eliminate video signals from all but one quadrant that would correspond to the programming for one television camera. This system was applied to each of four television cameras so that the four quadrants would be occupied with programming material to fill the entire raster of the television tube. In addition, this system included circuitry for selecting the programming material in one quadrant and then centering and expanding the picture to occupy the entire raster of the tube.

In application Ser. No. 364,163, a transmission system is described for audio and coding signals in an educational TV system. This system involves the use of guard-band blanking for 8 kilohertz bandwidth audio or cording channels which are added to the video signal. The audio signals are used in pairs to amplitude and phase modulate the 3.6 megahertz reference subcarrier in the same way as the I and Q signals do in conventional color encoders. This was accomplished by using two 3.6 megahertz subcarriers which have a quadrature phase relationship to each other and amplitude modulating each of them with an audio signal. The resulting amplitude modulated subcarriers are then added together to produce an amplitude and phase modulated signal which is then sampled during a guard-band interval. By repeating this process with another pair of audio signals, two bursts or pulses of modulated subcarriers are produced. The bursts are such that they can be separated and synchronously detected at the receiver to produce four separate audio signals. The 3.6 megahertz subcarrier necessary for the synchronous demodulation of the audio signals at the receiver may taken the form of a regenerated carrier used for the synchronous demodulation of the color information.

SUMMARY OF THE INVENTION

In accordance with the present invention there is provided an educational TV system including the combination of means for detecting frames of video signals wherein each frame includes four different scenes in the four quadrants of a television receiving tube, a plurality of camera means providing different scenes for each of the quadrants, adding means forming at least two video summation signals each of which corresponds to four scenes making up a frame, and encoder means receiving the video summation signals for modulating at least one of the summation signals onto a subcarrier signal.

In the preferred form, video signals for 12 scenes are transmitted on a single modulated carrier signal such that three video summation signals are provided corresponding to three frames, each including four scenes for display in the quadrants of the television receiving tube.

In a further aspect of the present invention, there is provided a receiver including switching means for selectively displaying any one of three video summation signals in the form of monochrome pictures. The receiver further includes detection means for one of the video summation signals, detection means for the two remaining video summation signals, and band-pass filters preceding the detection means for each video summation signal to prevent cross-modulation of the signals into each other.

In still a further aspect of the present invention, there is provided 12 audio channels on video waveforms for a single television channel comprising means for inserting into the video waveform a quard-band blanking period during which bursts of amplitude and phase modulated subcarriers are used to carry pairs of audio signals, there being three such bursts of subcarriers for insertion into one video line for carrying a first group of six audio signals and on a succeeding video line there is inserted a second group of six signals.

These features and advantages of the present invention as well as others will be more apparent to those skilled in the art when the following description is read in light of the accompanying drawings, in which.

Figure 3:
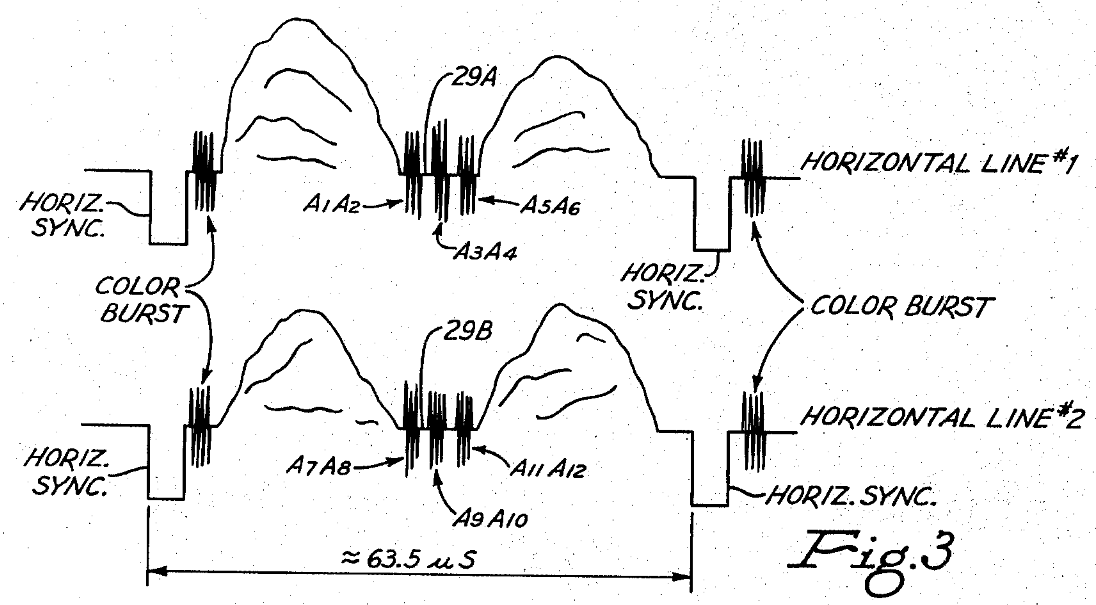
Figure 4:
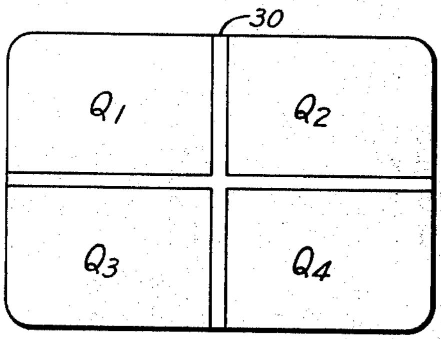
Figure 8:
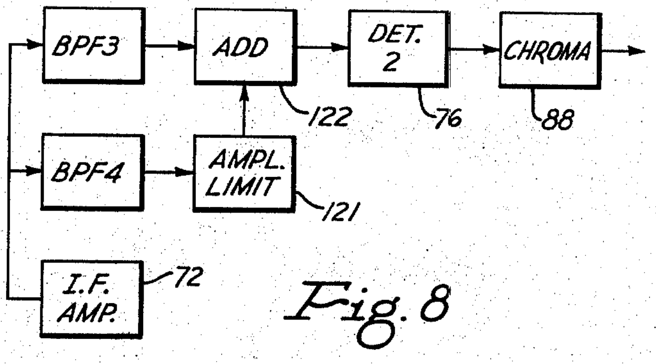
Figure 6:
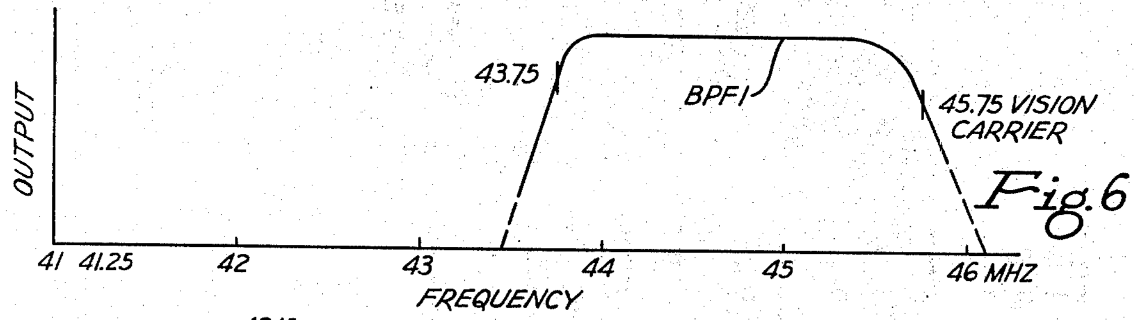
Figure 7:
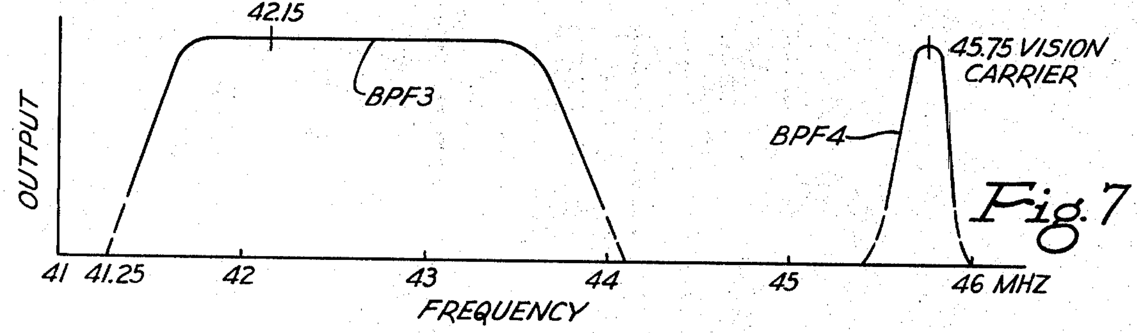
Figure 5:
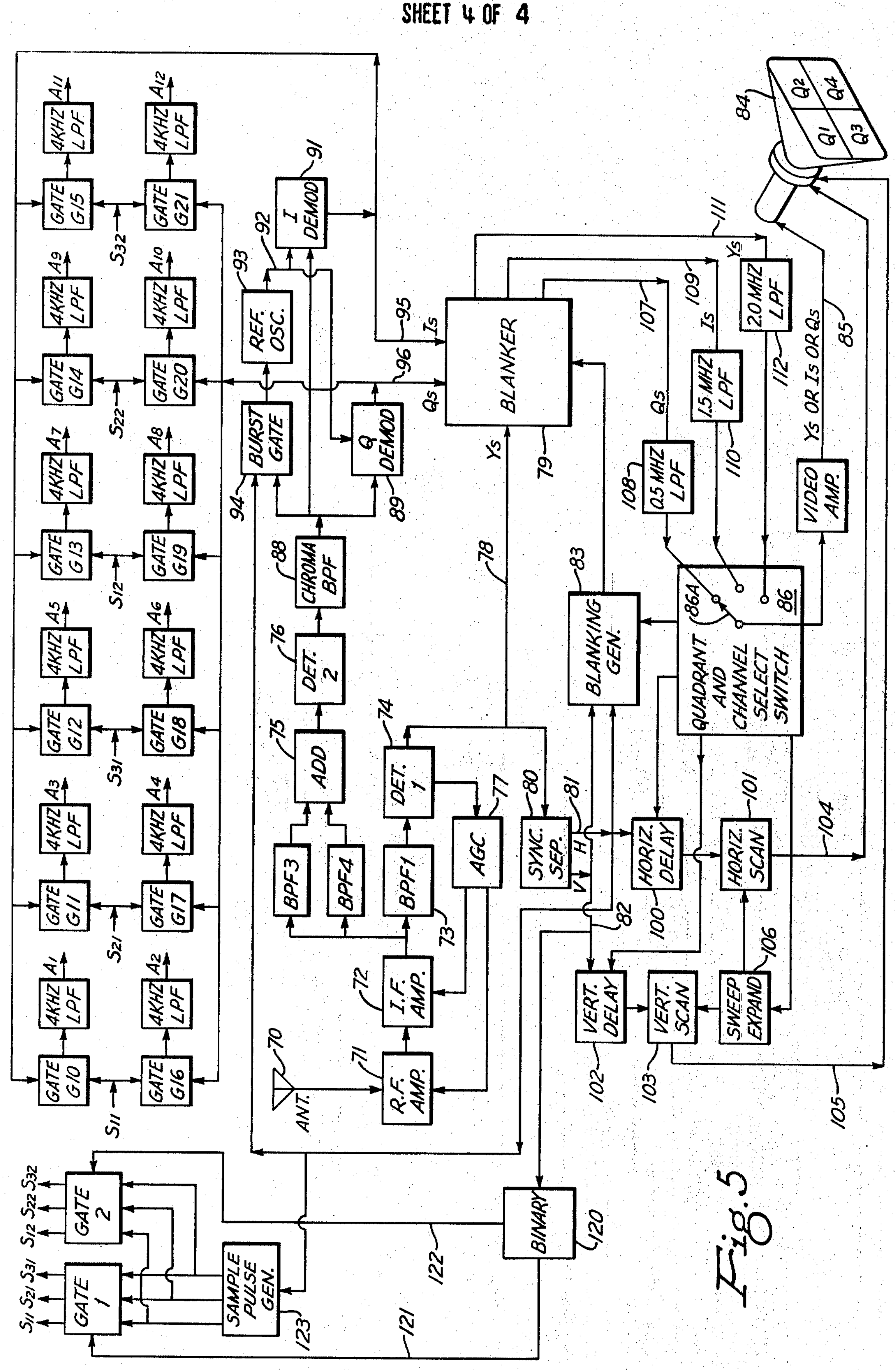

FIG. 3 comprises two waveforms of video lines illustrating the position of audio signal bursts inserted into the video lines;

FIG. 4 illustrates the division into four quadrants of the receiving tube;

FIG. 5 is a block diagram of a television receiver embodying the features of the present invention for receiving twelve video and twelve audio signals;

FIGS. 6 and 7 comprise waveforms illustrating the operation of the circuitry of FIG. 5; and FIG. 8 is a block diagram illustrating a second embodiment of apparatus for reducing cross-modulation in the television receiver illustrated by FIG. 5.

Figure 1:
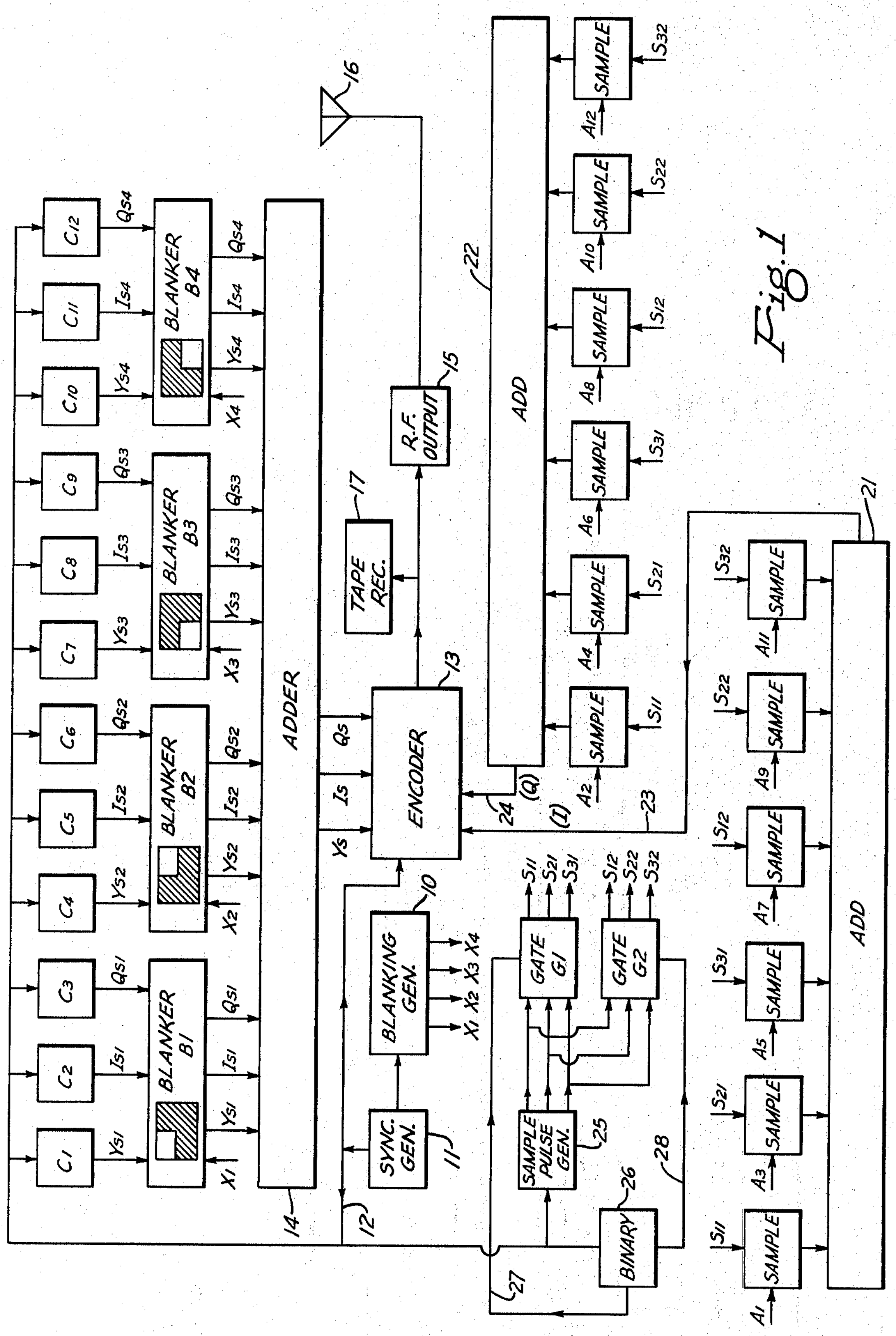
FIG. 1 is a block diagram of a television transmitter for transmitting twelve video and twelve audio signals on a single television channel according to the features of the present invention.

With reference now to the drawings, and particularly to FIG. 1, a television transmission system is shown which includes 12 television cameras C1, C2, C3, C4, C5, C6, C7, C8, C9, C10, C11, and C12, each of which is trained on a different scene. For the purpose of the present discussion, it will be assumed that the cameras C1–C12 are monochrome cameras; however, those skilled in the art will appreciate that other means for providing video signals such as a plurality of tape recorders may be used with equal success. The video output signals of the cameras C1–C3 are denoted as $Y_{S1}$, $I_{S1}$ and $Q_{S1}$, respectively, and these signals are connected to a blanking circuit B1. The cameras C4–C6 provide video output signals denoted as $Y_{S2}$, $U_{S2}$ and $Q_{S2}$, respectively, and these signals are connected to a blanking circuit B2. The cameras C7–C9 have video output signals $Y_{S3}$, $I_{S3}$ and $Q_{S3}$, respectively, which are connected to a blanking circuit B3. The cameras C10–C12 have video output signals $Y_{S4}$, $I_{S4}$ and $Q_{S4}$, respectively, which are connected to a blanking circuit B4. The blanking circuits B1– B4, in turn, have applied thereto blanking signals X1, X2, X3 and X4 derived from a blanking generator 10 connected to a transmitter sync generator 11. The transmitter sync generator signal is also supplied by line 12 to each of the cameras C1–C12 and to the encoder 13.

The blanking signal applied to the blanking circuit B1, for example, will blank out all that portion of a conventional television picture frame except the upper left-hand quadrant for each of the video signals provided by cameras C1-C3. The blanking circuit B2 will blank out all but the upper right-hand quadrant of the frame for each of the video signals provided by cameras C4–C6. The blanking circuit B3 will blank out all but the lower left-hand quadrant of the frame for each of the video signals provided by the cameras C7–C9. The blanking circuit B4 will blank out all but the lower right-hand quadrant of each of the video signals provided by the cameras C10–C12.

The signals passing through the respective blanking circuits B1–B4 are then summed in a summation circuit 14 in the following manner: The signals $Y_{S1}$, $Y_{S2}$, $Y_{S3}$ and $Y_{S4}$ are summed together. The signals $I_{S1}$, $I_{S2}$, $I_{S3}$ and $I_{S4}$ are summed together. The signals $Q_{S1}$, $Q_{S2}$, $Q_{S3}$ and $Q_{S4}$ are summed together. After the summation of the signals occurs, three resultant signals are delivered to the encoder 13. They are the $Y_S$ signals formed by the various $Y_S$ signals and $I_S$ signals formed by the various $I_S$ signals and a $Q_S$ signal formed by the various $Q_S$ signals. The encoder receives in the usual manner vertical and horizontal sync pulses which are added from the sync generator 14. As a result of the summation of the outputs of the blanking circuits B1–B4, the signals $Y_S$, $I_S$ and $Q_S$ are each in the form of composite video signals wherein each frame there are four different scenes which appear at the four quadrants of a display tube. In other words, there are four scenes provided by each of the three signals $Y_S$, $I_S$ and $Q_S$ for a total of 12 scenes corresponding to those provided by the cameras C1–C12. The output of the encoder is connected to a radio-frequency output circuitry 15 which is, in turn, connected to a transmitting antenna 16. The output from the encoder can also be applied to a tape recorder 17.

The television transmitting system illustrated by FIG. 1 further includes circuitry for the transmission of 12 audio signals by a similar number of audio channels included in the video signals from the radio-frequency output circuitry 15. As shown in FIG. 1, audio signals A1–A12 are each delivered to separate sample circuitry. The odd-numbered audio signals, that is A1, A3, A5, A7, A9 and A11 are, after sampling, connected to a summation circuitry 21. After sampling, the even-numbered audio signals, that is, A2, A4, A6, A8, A10 and A12 are connected to a summation circuitry 22. The output signal from circuitry 21 is connected by a line 23 to the encoder 13 and the output signal from the summation circuitry 22 is connected by a line 24 to the encoder 13.

Each of the sampled circuitry is operated in response to signal pulses. These pulses are produced according to the circuitry illustrated in FIG. 1 by delivering the signal from the sync generator 11 in line 12 to a sample pulse generator 25 which produces three pulses during a quard-band blanking period introduced into each horizontal scan line of the TV cameras. The sync generator signal in line 12 also is connected to a binary circuit 26 which produces control pulses in lines 27 and 28 that are connected to a gate circuitry G1 and a gate circuitry G2, respectively. The binary circuit opens gate circuit G1 during the scanning of the first line in the picture field according to a conventional standard procedure. The binary circuit then opens gate circuit G2 during the scanning of the second line in the picture field. This is then followed by opening gate G1 during the third scan line. The binary continues alternate operation of the gates G1 and G2.

Referring to FIG. 3, the guard-band blanking period 29A is positioned in horizontal line 1 of the video waveform midway within the video signal picture domain. In the horizontal line 2 there is illustrated a guard-band blanking period 29B for the transmission of audio signals. The sync generator, as indicated, drives the pulse generator which produces three pulses during the guard-band blanking period of each line. The binary circuit opens gate circuit G1 during line 1 and allows the sampled pulses to pass through so as to operate the sample circuitry associated with audio signals A1–A6. During line 2, the binary circuit opens gate G2 and allows the sampled pulses to pass through the sample circuitry for audio signals A7–A12. The sampled audio signal pulses are then passed through the respective adder circuitry 21 and 22 from where they are connected to the encoder by lines 23 and 24. Thus, according to the present invention, one-half of the audio signals is inserted in alternate lines. The circuitry for transmitting these audio signals operates by adding audio signals A1 and A2 to a guard-band blanking period as bursts of amplitude and phase modulated subcarrier signals. Audio signals A3 and A4 are added to the guard-band blanking period as bursts of amplitude and phase modulated subcarrier signals and audio signals A5 and A6 are added as shown in FIG. 3 as bursts of amplitude and phase modulated subcarriers. The use of audio channels in this manner by sampling at approximately 8 kilohertz rate, limits the audio bandwidths to approximately 4 kilohertz. As illustrated by FIGS. 3 and 4, the guard-band blanking periods 29A and 29B ultimately appear within the viewing area of the receiving tube as a vertical bar 30. This bar divides the viewing area into two halves. These halves are made up of quadrants Q1 and Q3 in one half and Q2 and Q4 located in the other half.

Figure 2:
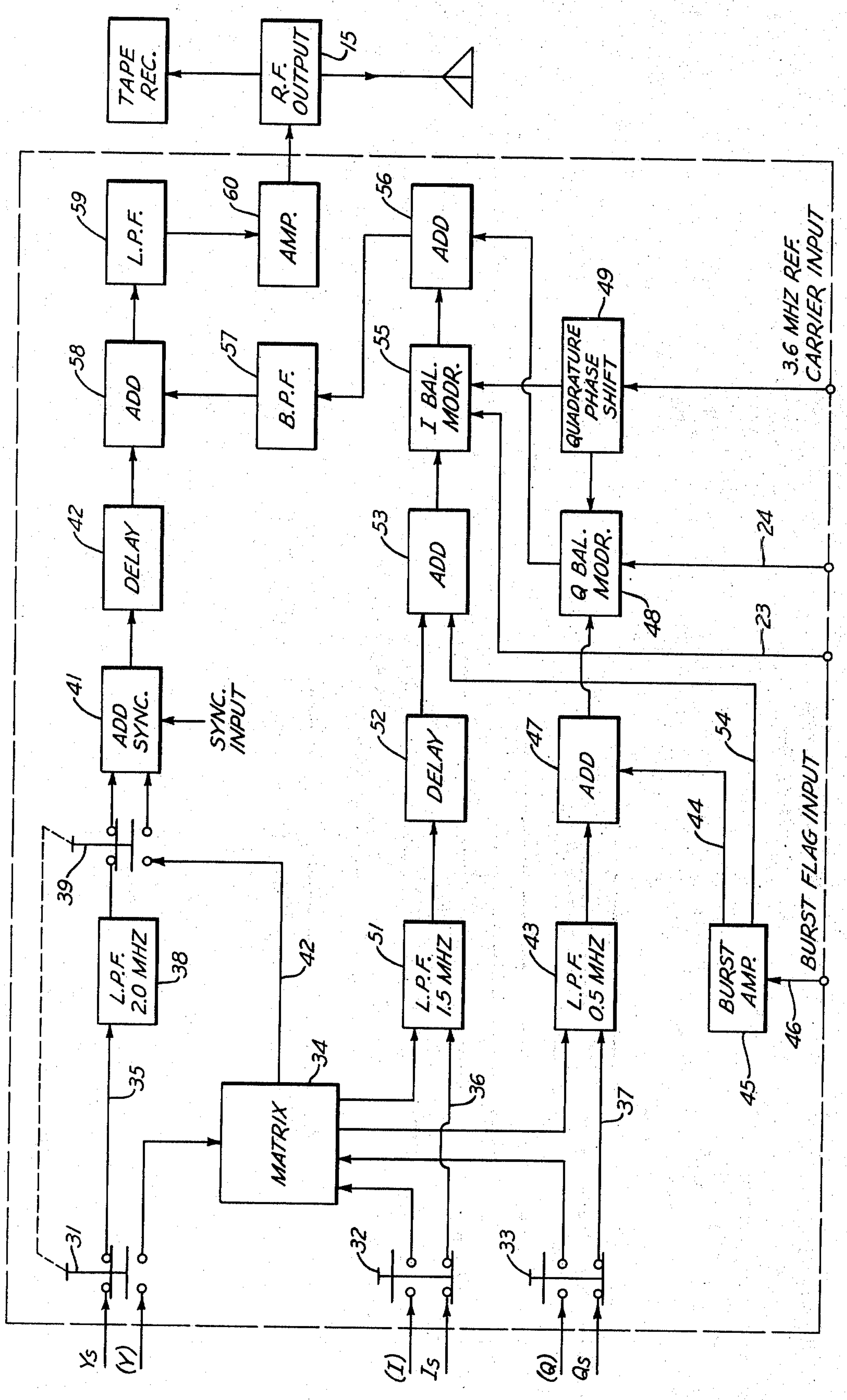
FIG. 2 illustrates a block diagram of a modified encoder employed in the circuitry illustrated by FIG. 1.

FIG. 2 illustrates in greater detail the encoder 13 which takes the form of a modified NTSC encoder wherein there is provided switches 31, 32 and 33 which, upon actuation thereof, are employed to deliver a Y input signal, a I input signal and a Q input signal, respectively, to a matrix circuit 34. The switches, when in their position shown in FIG. 2, deliver signals $Y_S$, $I_S$ and $Q_S$ to lines 35, 36 and 37, respectively. The $Y_S$ signal is then bandwidth limited by a low-pass filter 38 selected at 2.0 megahertz following which the $Y_S$ signal is connected to a switch 39 that is mechanically coupled to the switch 31 whereby the $Y_S$ signal is transferred to a summation circuitry 41 where a sync input signal is combined with the $Y_S$ signal. The $Y_S$ signal is then delivered to a delay circuitry 42. Should the encoder 13 be used in the conventional manner for color television transmission purposes, then the matrix circuitry 34 has an output signal Y in line 42 which passes through the switch 39 and into the summation circuitry 41 from where it continues in the manner to be described hereinafter. Either the $Q_S$ or Q signal depending upon the position of the switch 33 is bandwidth limited by the low-pass filter 43 selected at approximately 0.5 megahertz. A burst pulse is then added to the signal which, for the purpose of disclosing the present invention, will be discussed in terms of the $Q_S$ signal. The burst pulse is added to the $Q_S$ signal during the time of the back porch of the video signal by introducing a pulse in line 44 from a pulse amplifier 45 which also receives a burst flag, input along line 46. From the summation circuit 47, the Q signal is then fed to a Q balanced modulator 48 which also receives a subcarrier signal from a quadrature phase shift circuit 49 having an input reference signal of approximately 3.6 megahertz. The Q balanced modulator is also connected to the line 24 from the summation circuit 22 as previously described.

The $I_S$ or I signal depending upon the position of switch 32 is delivered to a low-pass filter 51 selected at approximately 1.5 megahertz. For the purpose of disclosing the present invention, it will be discussed in terms of the $I_S$ signal. The $I_S$ signal then passes from the filter 51 to a delay circuit 52 for synchronization with the Q signal due to the time lag produced by the unequal bandwidths of the low-pass filters in the $Q_S$ and $I_S$ signals. The $I_S$ signal is then added in circuitry 53 to a pulse signal transmitted along line 54 from the burst pulse amplifier 45. The $I_S$ is then fed to an I signal balance modulator 55 which also receives a subcarrier output signal from the quadrature phase circuit 49 and the audio signals delivered along line 23 from the summation circuit 21 as previously described. The outputs from the I balanced modulator and Q balanced modulator are in the form of amplitude modulated carrier signals having a quadrature phase relationship brought about by the phase shift in the circuitry 49. The audio signals in lines 23 and 24 which are connected to the I balanced modulator and Q balanced modulator, respectively, are used to amplitude and phase modulate the 3.6 megahertz reference subcarrier in the same way as the $I_S$ and $Q_S$ signals are modulated onto the subcarrier. As a result, the two modulated carrier signals are then added together in summation circuitry 56 to form a single carrier frequency signal whose amplitude and phase are a function of the relative portions of the $I_S$ and $Q_S$ video signals. From the summation circuitry 56, the $I_S$ and $Q_S$ signals are next bandwidth limited by a band-pass filter 57 from where these signals are summed with the $Y_S$ signal in the add circuitry 58. The composite signal of the $Y_S$, $I_S$ and $Q_S$ signals is then bandwidth limited by a low-pass filter 59 to conform to the NTSC specifications before being applied to an amplifier 60 and thence the radio-frequency output circuitry 15. It is important to note that the encoder 13 is modified so as to include the low-pass filter 38 selected at approximately 2.0 megahertz and the switches 31, 32, 33 and 39 permit the matrix circuitry 34 to be isolated in a manner such that it is not employed in connection with the transmission of the $Y_S$, $L_S$ and $Q_S$ signals and furthermore the use of the low-pass filter 38 limits the frequency domain of the $Y_S$ signal in a manner such that it can be separated out in the receiver in complete independence of the $I_S$ and $Q_S$ signals. This is necessary because otherwise the overlapping spectral response of these signals prohibits such independent detection of the signals.

FIG. 5 illustrates a block diagram of the receiver for decoding the composite signal made up of signal components $Y_S$, $I_S$ and $Q_S$ which are used to transmit the 12 video signals and the 12 audio signals. In the receiver, the antenna 70 provides a signal to an intermediate frequency amplifier 72. The output from the intermediate frequency amplifier is delivered to a filter 73 in the form of a band-pass filter BPF1 having an output signal delivered to a first detector 74. The signal from the intermediate amplifier 72 is also delivered to a band-pass filter BPF3 and a band-pass filter BPF4 having output signals delivered to an adder circuit 74 and then delivered to a second detector 76.

The output signal from the first detector 74 is connected to an automatic gain control amplifier 77 having output signals connected to the amplifiers 71 and 72 in accordance with usual practice. The first detector 74 is used to provide a $Y_S$ signal in line 78 which is connected to a blanker circuit 79 and to a sync separator circuit 80. The sync separator circuit delivers horizontal sync pulses in line 81 and vertical sync pulses in line 82. These sync pulses are applied to a blanking generator 83 which can be switched for no blanking of the picture or can blank out any three of the four quadrants of the picture as desired. For the purpose of the present discussion, it will be assumed that the output of the blanking generator 83 is applied to the grid within the receiving tube 84 via lead 85 and the quadrant and channel selector switch 86. Depending upon the output of the blanking generator 83 and the position of the quadrant and channel selector switch 86, pictures or scenes will appear at all four quadrants Q1, Q2, Q3 and Q4 on the receiving tube 84, or all but one can be blanked out by means of the quadrant and channel selector switch 86.

As discussed previously, the $Y_S$ signal after detection by the detector 74 is applied to the blanker 79. In accordance with the present invention, the second detector 76 is provided for detecting the $Q_S$ and $I_S$ signals. The use of this second detector avoids cross-modulation between the $Y_S$ signal and the $I_S$ and $Q_S$ signals. From the detector 76, the signal is applied to a chroma band-pass filter 88 having an output signal delivered to a Q demodulator 89, an I demodulator 91 and a burst gate 94. Both of the demodulators 89 and 91 receive a 3.58 megahertz reference signal in line 92 from a reference oscillator 93 that is controlled by the burst gate 94 which is responsive to a horizontal sync separator signal in line 81. After demodulation, the $I_S$ and $Q_S$ signals are delivered over lines 95 and 96, respectively, to the blanker circuit 79.

In order to centralize and expand any quadrant of the picture tube so as to fill the entire face of the tube for any desired size, circuitry is included to accomplish these objectives. In this regard, the horizontal sync pulses on line 81 are also applied to a horizontal delay circuit 100 which, in turn, controls a horizontal scan circuit 101 for the tube 84. Likewise, the vertical sync pulses in line 82 are applied through a vertical delay circuit 102 to a vertical scan generator 103. The scan generators 101 and 103 are connected through leads 104 and 105, respectively, to the deflection coil or yoke on the receiving tube. The horizontal scan generator 101 and the vertical scan generator 103 are connected to the output of a sweep expand circuit 106 which functions to increase the amplitude of the horizontal and vertical scan signals once a quadrant has been selected and centered by the switch 86. The quadrant and channel selector switch 86 also receives from the blanker 79 the $Q_S$ signal in line 107 after passing through an 0.5 megahertz low-pass filter 108; the $I_S$ signal in line 109 after passing through a 1.5 megahertz low-pass filter 110 and a $Y_S$ signal in line 111 after passing through a 2.0 megahertz low-pass filter 112. The quadrant and channel selector switch 86 includes as part of its circuitry a switch 86A which is used to select either the $Q_S$ signal, the $I_S$ signal or the $Y_S$ signal. Thus, depending upon the position of the switch 86A, the signal in line 85 corresponds to one of these signals and as discussed in regard to the transmitter, these signals each comprise separate video signals for each quadrant Q1, Q2, Q3 and Q4 on the picture tube. In addition to the switch 86A, other switching means are made accessible to the viewer so that the blanking out of all but one of the selected quadrants can be effected. Following this, the view exerts control over the horizontal and vertical display circuits along with the sweep expand circuit for the purpose of centering and expanding any one of the quadrants.

The receiver also includes gating and other circuitry employed to recover from the demodulated $I_S$ and $Q_S$ signals the 12 audio signals which were modulated onto the carrier signal as phase and amplitude modulated signals. For this purpose, the $I_S$ signal in line 95 is applied to each of six gates G10–G15. The $Q_S$ signal in line 96 is applied to each of six gates G16–G21. The gates G10 and G16 are open by a signal denoted as S11 whereby the demodulated audio signals of the $Q_S$ and $I_S$ carriers each pass through the 4 kilohertz low-pass filter to provide at its output an audio signal denoted as A1 and A2. Similarly, gates G11 and G17 are operated in response to a signal denoted as S21 so that in their open position, the audio signals are transferred through low-pass filters at 4 kilohertz to provide audio signals A3 and A4. The gates G12 and G18 are operated in response to a signal S31 so that the gates, when in their open position, pass a signal through a 4 kilohertz low-pass filter to provide audio signals A5 and A6, respectively. Gates G13 and G19 are operated in response to a signal S12 whereby the gates when they are in their open position pass the signals through low-pass filters at 4 kilohertz to provide audio signals A7 and A8. Gates G14 and G20 are operated in response to a signal S22 whereby the signals pass through the gates in their open position through a 4 kilohertz low-pass filter to provide audio signals A9 and A10. Gates G15 and G21 are operated by a signal S32 whereby the signals pass through the gates G15 and G21 thence through low-pass filters at 4 kilohertz to provide audio signals A11 and A12. The operation of gates G10–G21 in response to signals S11, S21, S31, S12, S22 and S32 is accomplished through the use of control gating circuitry. This circuitry includes a binary circuit 120 which is driven in response to the vertical sync pulses in line 82. The output from the binary circuit 120 is applied through lines 121 and 122 to gates G1 and G2, respectively. These gates also receive three signals from a sample pulse generator 123 which receives as an input signal the horizontal sync pulses in line 81. The binary is used for operation of the gates G1 and G2 in synchronism with the gating at the transmitter and as will be readily apparent from the circuit in FIG. 5 are driven in response to the vertical and horizontal sync pulses. At the output of the gates, pulses S11, S21 and S31 are delivered from gate G1 and pulses S12, S22 and S32 are delivered from gate G2.

The operation of the receiving circuit illustrated in FIG. 5 with respect to reducing cross-modulation of the $I_S$ and $Q_S$ signals from the detectors 76 and 74 may be understood by reference to the waveforms illustrated by FIGS. 6 and 7. The response frequencies of the band-pass filter BPF1 and band-pass filters BPF3 and BPF4 are illustrated by these waveforms. As shown, cutoff frequencies below 43.75 megahertz and above 45.75 megahertz occur by the use of the band-pass filter BPF1 where the latter frequency represents the vision carrier. By limiting the frequency of the band-pass filter BPF4 there is provided a separate vision carrier frequency centered about 45.75 megahertz. This made possible the ability to retain the intermediate frequency vision carrier in the detection of the 3.6 megahertz carrier that carries the $I_S$ and $Q_S$ signals. The frequencies 42.15 and 45.75 megahertz shown on the band-pass filter responses BPF1 and BPF3 are those normally used in American television receivers.

An alternative method of retaining the vision intermediate frequency carrier and further reducing the cross-modulation effects due to low frequency components situated near the vision intermediate frequency carrier is illustrated by the partial circuit shown in FIG. 8. In the modified form, the output of the vision intermediate frequency amplifier 72 is connected to band-pass filters BPF3 and BPF4. The signal from band-pass filter BPF4 is limited by an amplitude limiter 121 to remove amplitude modulations before the signal is recombined with the carrier containing the $I_S$ and $Q_S$ signals which pass through band-pass filters BPF3 and then into a summation circuit 122. From the summation circuit, the signal is delivered to the detector 76 and then to the chroma band-pass filter 88 which were previously described in regard to FIG. 5. Furthermore, in regard to FIG. 8, a reduction in the depth of the modulation of the transmitted radio-frequency carrier would help to reduce the cross-modulation effects as well as biasing at the receiver to overcome the initial nonlinearity of the detector diode formed in the circuitry 76 would prove advantageous.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. An apparatus for transmitting a plurality of separate pictures or scenes on a single television carrier signal such that at least two scenes are available for display in each of four quadrants of a television receiving tube, the combination comprising:

means for producing four groups of video signals, each of said groups including at least two separate video signals, adding means forming at least two summation signals by summing one video signal from each of said groups of video signals whereby each summation signal provides a different scene for display in the respective four quadrants of the television receiving tube, and encoder means receiving said two summation signals and modulating one of said summation signals onto a subcarrier signal for transmission with the other of said summation signal on a single television carrier signal.

2. An apparatus according to claim 1 further comprising blanker means receiving each one of said groups of video signals for limiting the scenes represented thereby for display in one quadrant of the television receiving tube.

3. An apparatus according to claim 2 wherein each of said four groups of video signals comprise three separate video signals, said adding means forming three summation signals by summing one video signal from each group of signals whereby each summation signal provides a different scene for the four quadrants of a TV receiving tube, said encoder means including means for modulating two of said summation signals in a quadrature phase relation onto a subcarrier signal for transmission with the remaining summation signal on a single television carrier signal.

4. An apparatus according to claim 3 wherein said encoder further includes filter means for limiting the frequency domain of each of said three summation signals.

5. An apparatus according to claim 4 further comprising means defining a guard-band blanking period in said subcarrier signal for transmission of pairs of audio signals in the form of bursts of amplitude and phase modulated subcarriers.

6. An apparatus according to claim 4 further comprising:

audio sampling means for a first group of audio signals during a guard-band blanking period, audio sampling means for a second group of audio signals during a guard-band blanking period, first adding means receiving the first group of sampled audio signals for forming a first audio summation signal, second adding means receiving the second group of sampled audio signals for forming a second audio summation signal, and means for delivering said first and second groups of audio signals to said encoder means to thereby phase and amplitude modulate a sampled audio signal from each group onto a subcarrier signal for transmission on a single television carrier signal.

7. An apparatus according to claim 6 wherein said audio sampling means include a plurality of sample circuitry each for receiving an audio signal, gate means for controlling said sample circuitry, a sample pulse circuit generator for operating said gate means, and a binary circuit for operating said gate means in conjunction with said sample pulse circuit generator.

8. An apparatus according to claim 7 wherein said audio sampling means further include a sync generator producing sync pulses delivered to said sample pulse circuit generator and said binary circuit.

9. An apparatus according to claim 8 wherein said first group of audio signals comprises six separate signals, said second group of audio signals comprises six separate signals, and said audio sampling means being arranged to produce three pairs of audio signals from each group of signals such that said pairs of audio signals are inserted into said guard-band blanking period during one horizontal scan line produced by said video signals.

10. In a television system for transmitting and receiving a plurality of separate pictures or scenes on a single television carrier signal such that at least two scenes are available for display in each of four quadrants of a television receiving tube, the combination comprising:

means for producing four groups of video signals, each of said groups including at least two separate video signals, adding means forming at least two summation signals by summing one video signal from each of said groups of video signals whereby each summation signal provides a different scene for display in the respective four quadrants of the television receiving tube, encoder means receiving said two summation signals and modulating one of said summation signals onto a subcarrier signal for transmission with the other of said summation signals on a single television carrier signal, first detection means for one of said two summation signals, second detection means for the other of said two summation signals, and band-pass filter means preceding each of said detection means to thereby prevent cross-modulation of said summation signals into each other.

11. In a television system for transmitting and receiving a plurality of separate pictures or scenes on a single television carrier to provide three scenes for display in each of four quadrants of a television receiving tube, the combination comprising:

means for producing four groups of video signals, each of said groups comprising three separate video signals, adding means forming $Y_S$, $I_S$ and $Q_S$ summation signals by summing one video signal from each of said groups of video signals whereby each summation signal provides a different scene for display in the respective four quadrants of the television receiving tube, encoder means receiving said summation signals and modulating said $I_S$ and $Q_S$ summation signals onto a carrier signal for transmission with said $Y_S$ summation signal on a single television carrier signal, detector means for said $Y_S$ summation signal, detector means for said $I_S$ and $Q_S$ summation signals, and band-pass filter means preceding each of said detector means for preventing cross-modulation of said summation signals into each other.

12. In a television system according to claim 11 wherein said band-pass filter means include separate band-pass filters for receiving said $I_S$ and $Q_S$ summation signals, adding means receiving the output signal from said separate band-pass filter means, and demodulating means receiving said $Q_S$ and $I_S$ summation signals from said adding means.

13. In a television system according to claim 12 further comprising amplitude limiting means receiving the output signal from one of said separate band-pass filters for delivering an amplitude limited signal to said adding means.

14. In a television system according to claim 12 further comprising:

blanker means receiving said $Y_S$ summation signal and the demodulated $Q_S$ and $I_S$ summation signals, a blanking generator having an output signal connected to said blanker means, and switch means receiving said $Y_S$, $I_S$ and $Q_S$ summation signals from said blanker means for selective display of one of said summation signals on the television receiving tube.

15. In a television system according to claim 14 further comprising filter means in the signal path of said $Y_S$, $I_S$ and $Q_S$ summation signals between said blanker means and said switch means.

16. In a television system according to claim 15 further comprising:

audio sampling means for a first group of audio signals during a guard-band blanking period, audio sampling means for a second group of audio signals during a guard-band blanking period, first adding means receiving the first group of sampled audio signals for forming a first audio summation signal, second adding means receiving the second group of sampled audio signals for forming a second audio summation signal, and means for delivering said first and second groups of audio signals to said encoder means to thereby phase and amplitude modulate a sampled audio signal from each group onto a subcarrier signal for transmission on a single television carrier signal.

17. In a television system according to claim 16 further comprising:

sync separator means receiving said $Y_S$ summation signal for providing a horizontal sync pulse and a vertical sync pulse, first gate means responsive to said horizontal and vertical sync pulses, second gate means receiving said $Q_S$ summation signal, third gate means receiving said $I_S$ summation signal, and filter means receiving the output signal from each of said second and third gate means for providing a plurality of audio signals.

18. In a television system according to claim 17 wherein said first gate means comprises:

a binary circuit responsive to said vertical sync pulse, a sample pulse generator circuit responsive to said horizontal sync pulse, and gates controlled in response to signals provided by said binary circuit and said sample pulse generator circuit for operation of said second and third gate means.

19. In a television system according to claim 18 wherein said second and third gate means each comprise six gate circuits.

* * * * *